Patented June 27, 1944

2,352,263

UNITED STATES PATENT OFFICE 2,352,263

STABILIZATION OF VINYL ESTERS

Frederick Noel Hopper, Niagara Falls, N. Y., assignor to Niacet Chemicals Corporation, a corporation of New York No Drawing. Application March 6, 1942, Serial No. 433,601

3 Claims. (Cl. 260—488)

This invention relates to the stabilization of vinyl esters of aliphatic acids during distillation or storage.

It is known that monomeric vinyl acetate may be stabilized to inhibit polymerization, and a number of addition materials have been suggested for this purpose.

I have found that arylamines are excellent stabilizers or inhibitors against polymerization for monomeric vinyl esters of aliphatic and aromatic carboxylic acids and that polymerization of such vinyl esters as vinyl acetate, vinyl formate, vinyl propionate and vinyl benzoate may be inhibited by the addition of a relatively small amount of an arylamine to the monomeric ester. I have also found that the use of diphenylamine as a stabilizer has the advantage of inhibiting the development of undesirable acidity in the monomeric vinyl ester even on prolonged storage, and that a low acidity is maintained in the inhibited monomeric vinyl ester when stored in the usual commercial steel container.

In general, good results may be obtained using diphenylamine as an inhibitor in an amount about 0.01% to 0.1% by weight of the monomeric vinyl ester, although larger and smaller amounts may be used, if desired. However, an amount larger than 0.1% by weight of the vinyl ester is usually unnecessary. Exceptionally good results have been obtained in treating monomeric vinyl acetate with about 0.01% to 0.06% by weight of diphenylamine, based on the monomer.

Example 1

Monomeric vinyl acetate to which had been added a small amount of diphenylamine was heated at a temperature of 150° C. for a period of 15 hours in sealed glass containers. At the end of that time, the vinyl acetate thus treated was cooled and the change in viscosity noted. This change in viscosity was measured by the difference in time, expressed in seconds, required for the same volume of the final and initial substances to pass between the two marked points on an Ostwald viscosimeter, at 28° C. The following results were obtained using different amounts of diphenylamine stabilizer:

| Diphenylamine g./100 cc. monomer | Change in viscosity [1] |
|---|---|
| | Seconds |
| .01 | 5,228 |
| .02 | 584 |
| .03 | 235 |
| .04 | 133.6 |
| .05 | 44.7 |
| .06 | 13.3 |
| .08 | 0 |
| .10 | 0 |

[1] Indicated by the difference in time, expressed in seconds, required for flow of the inhibited vinyl acetate before and after treatment.

Control tests carried out simultaneously on unstabilized vinyl acetate monomer gave in each instance a plastic solid exhibiting no flow at room temperatures.

Example 2

Monomeric vinyl acetate containing a small amount of copper resinate and a small amount of diphenylamine was stored in a partly filled drum. Two similar drums partly filled with monomeric vinyl acetate, the one containing only copper resinate and the other containing only diphenylamine as inhibitors, were stored under the same conditions as a check. The acidity was determined at the start and at the end of four months with the following results:

| Addition material (per cent by weight)[1] | Acidity | |
|---|---|---|
| | Initial | 4 months |
| | Per cent | Per cent |
| Copper resinate, 0.005 | 0.0033 | 0.031 |
| Diphenylamine, 0.03 | 0.0016 | 0.0049 |
| Copper resinate, 0.005 Diphenylamine, 0.03 | 0.0009 | 0.001 |

[1] Based on the monomer.

Diphenylamine is useful as an acidity and polymerization inhibitor not only for vinyl acetate but also for other vinyl esters of aliphatic and aromatic carboxylic acids such as, for example, vinyl formate, vinyl propionate, vinyl benzoate and the like.

It will be readily apparent from the foregoing description that embodiments of the invention other than specifically disclosed may be employed, and it is to be understood that these are intended to be included within the scope of the invention.

I claim:

1. Monomeric vinyl ester of a carboxylic acid inhibited against polymerization and development of excessive acidity by the addition thereto of diphenylamine in an amount about 0.01% to 0.1% by weight of the vinyl ester.

2. Monomeric vinyl acetate containing diphenylamine in an amount about 0.01% to 0.1% by weight of the vinyl acetate.

3. The process of inhibiting the development of undesirable acidity which includes adding to monomeric vinyl acetate an amount of diphenylamine which is about 0.01 to 0.1 percent by weight of the monomeric vinyl acetate.

FREDERICK NOEL HOPPER.